US011505139B2

(12) United States Patent
Kistler

(10) Patent No.: US 11,505,139 B2
(45) Date of Patent: Nov. 22, 2022

(54) METHOD FOR PROVIDING SENSOR-BASED VEHICLE FUNCTIONS IN A MOTOR VEHICLE, AND MOTOR VEHICLE COMPUTING DEVICE AND MOTOR VEHICLE

(71) Applicant: AUDI AG, Ingolstadt (DE)

(72) Inventor: Günter Kistler, Niederlauterbach (DE)

(73) Assignee: AUDI AG, Ingolstadt (DE)

( * ) Notice: Subject to any disclaimer, the term of this patent is extended or adjusted under 35 U.S.C. 154(b) by 441 days.

(21) Appl. No.: 16/478,595

(22) PCT Filed: Jan. 15, 2018

(86) PCT No.: PCT/EP2018/050841
§ 371 (c)(1),
(2) Date: Jul. 17, 2019

(87) PCT Pub. No.: WO2018/134149
PCT Pub. Date: Jul. 26, 2018

(65) Prior Publication Data
US 2020/0047693 A1   Feb. 13, 2020

(30) Foreign Application Priority Data
Jan. 17, 2017   (DE) ...................... 10 2017 200 654.4

(51) Int. Cl.
*B60R 16/023*   (2006.01)
*H04W 4/44*   (2018.01)
(Continued)

(52) U.S. Cl.
CPC ........... *B60R 16/023* (2013.01); *B60W 50/00* (2013.01); *G05B 15/02* (2013.01); *H04W 4/44* (2018.02); *B60W 2050/0001* (2013.01)

(58) Field of Classification Search
CPC .................................................. B60R 16/023
See application file for complete search history.

(56) References Cited

U.S. PATENT DOCUMENTS 6,505,100 B1   1/2003   Stuempfle et al.
7,058,485 B2   6/2006   Thomas et al.
(Continued)

FOREIGN PATENT DOCUMENTS

CN   104380349 A   2/2015
CN   105320035 A   2/2016
(Continued)

OTHER PUBLICATIONS

International Preliminary Report on Patentability directed to related International Patent Application No. PCT/EP2018/050841, dated May 16, 2019, with attached English-language translation; 16 pages.
(Continued)

*Primary Examiner* — Michael A Berns
(74) *Attorney, Agent, or Firm* — Sterne, Kessler, Goldstein & Fox P.L.L.C.

(57) ABSTRACT

The present application relates to a method for providing vehicle functions in a motor vehicle, the vehicle functions being provided in a computing device of said motor vehicle on the basis of sensor data from a sensor device of the motor vehicle. The invention provides that the vehicle functions in the motor vehicle are coupled to the sensor device via an integration component, and the integration component procures the sensor data from one sensor unit or a plurality of sensor units of the sensor device independent of the vehicle functions by means of a respective sensor-specific detection routine and generates respective state data therefrom and each of the vehicle functions respectively retrieves at least some of the provided state data from the integration component by means of a sensor-independent retrieval routine.

20 Claims, 1 Drawing Sheet

(51) Int. Cl.
*B60W 50/00* (2006.01)
*G05B 15/02* (2006.01)

(56) References Cited

U.S. PATENT DOCUMENTS

| | | | |
|---|---|---|---|
| 9,031,710 B2* | 5/2015 | Barrett | B60R 16/023 |
| | | | 701/1 |
| 9,469,259 B2 | 10/2016 | Grimm et al. | |
| 9,494,935 B2 | 11/2016 | Okumura et al. | |
| 9,767,626 B2* | 9/2017 | Makke | B60Q 1/0076 |
| 9,981,615 B2* | 5/2018 | Flick | B60R 16/023 |
| 10,078,964 B2 | 9/2018 | Li et al. | |
| 2014/0129047 A1 | 5/2014 | Barrett | |
| 2014/0277838 A1 | 9/2014 | Flick | |
| 2014/0306799 A1 | 10/2014 | Ricci | |
| 2017/0011561 A1 | 1/2017 | Makke et al. | |
| 2019/0375349 A1* | 12/2019 | Kistler | G05B 19/042 |
| 2020/0047693 A1* | 2/2020 | Kistler | G08G 1/096775 |

FOREIGN PATENT DOCUMENTS

| | | |
|---|---|---|
| CN | 105593783 A | 5/2016 |
| CN | 10623353 A | 12/2016 |
| CN | 106227115 A | 12/2016 |
| DE | 19909157 A1 | 9/2000 |
| DE | 10052570 A1 | 4/2002 |
| DE | 10308460 A1 | 9/2004 |
| DE | 102004049155 B3 | 5/2006 |
| DE | 102012107886 A1 | 2/2014 |
| DE | 102015118489 A1 | 5/2016 |
| WO | WO 2015/048307 A1 | 4/2015 |

OTHER PUBLICATIONS

International Search Report and Written Opinion of the International Searching Authority directed to related International Patent Application No. PCT/EP2018/050841, dated Jun. 14, 2018, with attached English-language translation; 22 pages.

* cited by examiner

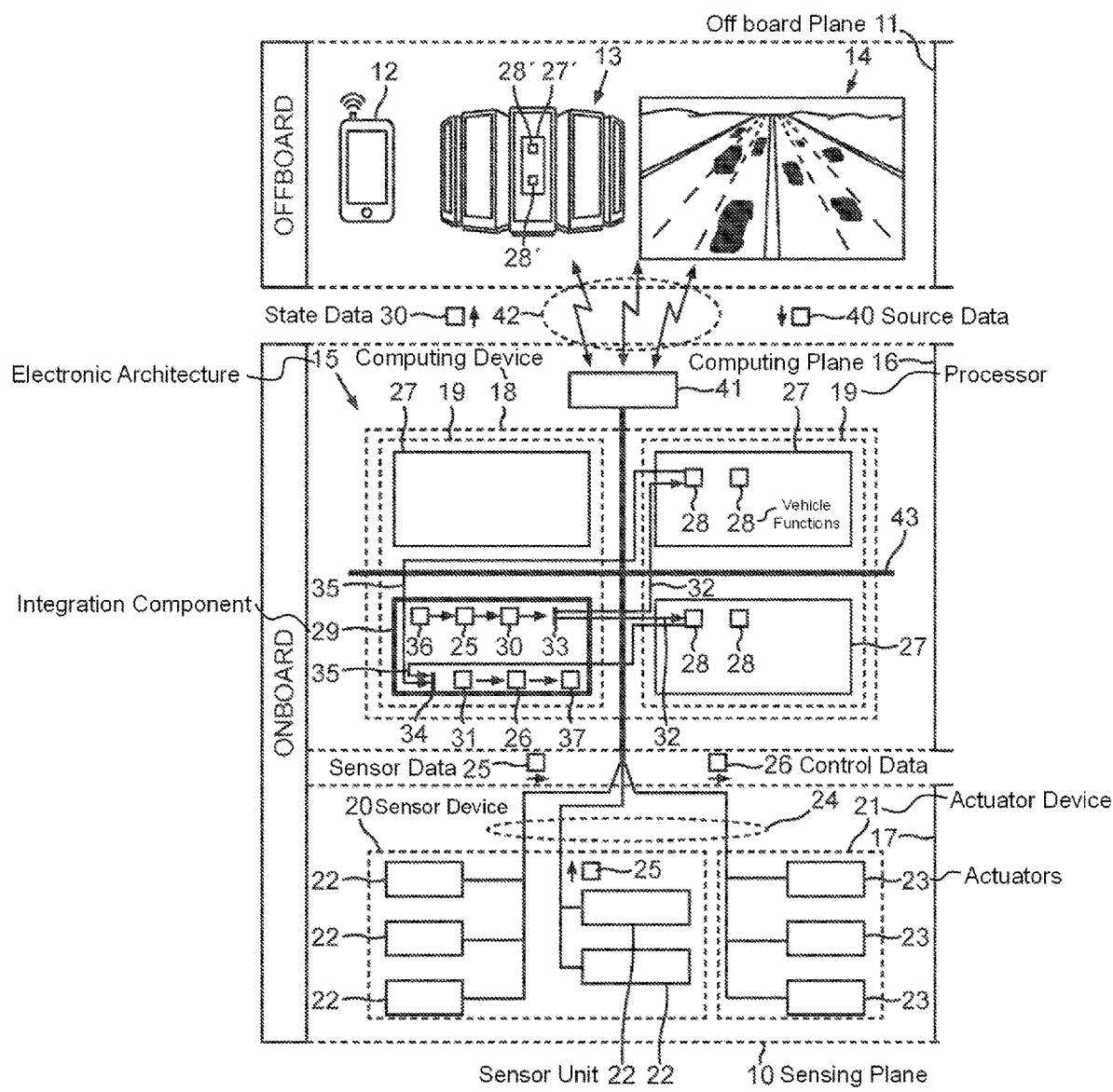

METHOD FOR PROVIDING SENSOR-BASED VEHICLE FUNCTIONS IN A MOTOR VEHICLE, AND MOTOR VEHICLE COMPUTING DEVICE AND MOTOR VEHICLE

TECHNICAL FIELD

The present application relates to a method for providing vehicle functions in a motor vehicle. The vehicle functions are each sensor-based, i.e. they are executed as a function of sensor data of a sensor device of the motor vehicle. In the motor vehicle, there is a sensor plane and a superordinate computing plane on which a computing device executes a plurality of vehicle functions. The invention also includes the computing device for executing the vehicle functions. Finally, the invention also comprises the motor vehicle with a sensor device and with a computing device.

BACKGROUND

In a today's control device, it is usually provided that it is constructed for a particular vehicle function and is therefore also interconnected directly to the sensors that are needed for the vehicle function. The software or functional component by means of which the vehicle function is provided is stored in a data memory of the control unit in the production process thereof and is adapted to the available, attached sensor technology. A functional extension or functional change during the runtime of the control device, that is, after installation in a motor vehicle, is not provided or requires modification or service.

Thus, vehicle functions are tied to a respective control device and must be adapted to the construction of the sensors. A change of a vehicle function is only possible by a complete replacement of the software of the control device. Reloading of individual vehicle functions is not provided for a control device. A motor vehicle with a plurality of vehicle functions accordingly also has a plurality of control devices, so that a plurality of control devices is available in the motor vehicle, each of which is designed in a specialized manner.

From DE 10 2004 049 155 B3, a diagnostic system for a motor vehicle is known, in which a plurality of software components, which have to exchange data with each other, are installed on a common control device. In this way, communication paths are shortened.

From DE 10 2012 107 886 A1, a method for the electronic detection of traffic signs is known, in which an object recognition unit is linked directly to a camera in order to receive image data of the camera.

From DE 10 2015 118 489 A1, a remote control of an autonomous vehicle is known. In the vehicle, a laptop or generally a computing apparatus can be attached to sensors of the motor vehicle and to vehicle systems of the motor vehicle, such as a drive system. The computing apparatus can also be linked to the Internet via a communication interface.

From DE 100 52 570 A1 a system for controlling operational processes in a motor vehicle is known which comprises a plurality of software modules divided into a hardware-dependent and a hardware-independent part. In order to couple these parts, they exchange data via interfaces not in a hardware-specific format but as physical values, such as the temperature in Kelvin.

From DE 199 09 157 A1 a distributed vehicle information processing system is known, which can have a system part in the motor vehicle and a system part outside of the motor vehicle on a server. Individual components of the system are interconnected via service interfaces.

From DE 103 08 460 A1, a system for controlling an internal combustion engine is known. An abstraction of sensor/actuator control operations on the one hand and software-based control operations on the other is provided for the system by means of an encapsulation module.

BRIEF DESCRIPTION OF THE DRAWINGS/FIGURES

FIG. 1 shows a schematic representation of a motor vehicle, in accordance with some embodiments.

DETAILED DESCRIPTION

The object of the present application is to flexibly provide vehicle functions in a motor vehicle.

The object is achieved by the subject-matters of the independent claims. Advantageous further embodiments of the present application are described by the features of the dependent claims, the following description, and the drawings.

In accordance with some embodiments, a method for providing vehicle functions in a motor vehicle is disclosed. A respective example for such vehicle functions are parking assistance, autonomous driving, climate management, a driver assistance function, a distance control system, an overtaking assistance system. The motor vehicle can be thought of as being divided into a sensor plane and a logical computing plane. For realizing the computing plane, the method stipulates that a computing device of the motor vehicle executes or provides a plurality of vehicle functions. These vehicle functions are based on sensor data from a sensor device, which in turn represents overall the logical sensor plane. In other words, vehicle functions are executed on the basis of sensor data from the sensor equipment of the motor vehicle. As a sensor unit, for example, one of the following can be provided: a temperature sensor, a rotational speed sensor, a current sensor for electric current, a filling plane sensor, a camera, to name just a few examples. The computing device can have one or more microprocessors and/or microcontrollers for execution of the vehicle functions. The computing device can be realized by an individual control device or by an interconnection of a plurality of control devices. The vehicle functions can each be realized, for example, by a program module or program code.

In accordance with some embodiments, in order to logically separate the two planes (computing plane and sensor plane) or to isolate them from another in the motor vehicle, the vehicle functions are coupled to the sensor device via an integration component. This integration component can also be part of the computing device, for example a program module or program code. The integration component mediates between the vehicle functions on the one hand and at least one sensor unit of the sensor device on the other. It is therefore an intermediary component and integrates the sensor system into the computing plane. The integration component procures for this purpose the said sensor data from one sensor unit or from a plurality of sensor units of the sensor device regardless of the vehicle functions. In other words, from the point of view of the integration component, it does not matter for which of the vehicle functions the sensor data is procured. In other words, the integration component procures the sensor data without a request from one of the vehicle functions. The integration component procures the sensor data by means of a sensor-specific detection routine. In other words, the integration component is adapted to the respective sensor unit in order to receive or read the sensor data. The integration component then transforms the sensor data into respective environmental data or general state data. For this purpose, the sensor data can be converted or combined, for example, which is described in more detail hereafter. In general, the integration component generates state data from the respective sensor data, i.e. the state data can also be identical to or contain the sensor data on which they are based.

Each of the vehicle functions therefore does not have to be familiar or concerned with the procuring of the sensor data from the sensor unit or the sensor units of the sensor device. Instead, each of the vehicle functions retrieves at least some of the state data provided by means of a sensor-independent retrieval routine from the integration component. The retrieval routine can be realized as an API (Application Specific Interface) of the integration components. Each vehicle function can therefore use a retrieval routine that does not have to be adapted to the sensor unit or sensor units of the sensor device. Thus, the vehicle function is hardware-independent. This results in a uniform protocol for the vehicle functions. The replacing of a sensor unit thus does not require that the vehicle function is adapted.

Each of the vehicle functions therefore does not have to be familiar or concerned with interpreting of sensor-specific sensor data. Instead, each of the vehicle functions retrieves a retrieval routine from the integration component and accepts the environmental data indicating the measured size in a format that can differ from a sensor-specific (e.g., manufacturer-specific) format of the sensor data. The sensor-specific detection routine, on the other hand, can contain control commands and/or protocols that are only interpreted or generated by the sensor, e.g., the detection routine can receive a sensor-specific indication from a sensor. Examples of the sensor-specific indication may comprise "12 ticks left" for a steering angle, and from this the sensor may generate sensor-independent interpretable environmental data, e.g. "5° left". The conversion then takes place in the integration component.

In accordance with some embodiments, the state data are available for a plurality of vehicle functions, so that not every vehicle function itself has to procure the sensor data it needs from the same sensor unit. Preferably, an individual integration component is provided, from which all vehicle functions can retrieve the state data.

The advantage of the separate computing plane and sensor plane is that a vehicle function on the one hand and a sensor unit on the other hand can be replaced without the other part requiring an adaptation. The integration component mediates between vehicle functions on the one hand and at least one sensor unit of the sensor device on the other. In addition, the vehicle functions can be developed independent of the sensor units used in the motor vehicle and can be used in motor vehicles with different sensor units.

In accordance with some embodiments, a third plane, namely an offboard plane, in addition to the two logical planes, namely the computing plane or computing plane and the sensor-actuator plane may be provided. The offboard plane is external to the vehicle. To realize this, the computing device is coupled to a communication device. The communication device operates a respective communication link with at least one third-party device remote from the vehicle. Such a third-party device can be a device external to the vehicle or a mobile terminal in the motor vehicle. A third-party device external to a vehicle can, for example, be an Internet server or another motor vehicle. For example, for the transmitting of the data, a mobile radio module (e.g., Global System for Mobile Communication (GSM), Universal Mobile Telecommunications Service (UMTS), Long Term Evolution (LTE)), a Wireless Local Area Network (WLAN) module, a communication module for Car2X communication, and/or vehicle-to-vehicle communication module can be provided in the communication device. The integration component can couple the sensor plane with the offboard plane. For this purpose, it can be provided that the integration component emits at least some of its state data (formed from the sensor data) to at least one vehicle function which is executed externally to the vehicle and is outsourced via the said communication device. This means that a vehicle function "offboard" can also be performed outside the motor vehicle. Such an outsourced vehicle function can, for example, be a navigation assistance (route guidance) or voice recognition.

The vehicle's own or internal vehicle functions are coupled to the offboard plane. For this purpose, the integration component receives source data such as sensor data via the communication device. From the source data, the integration component generates further state data for the vehicle functions operated in the motor vehicle. In this way, for example, weather data can be provided as additional state data or media content (music streaming, video streaming) or map data. The vehicle functions can then retrieve these additional state data by means of at least one retrieval routine, just as sensor data can be retrieved. Thus, it can be irrelevant to a vehicle function whether the state data originates from the offboard plane or from the sensor plane. In addition, it can also be provided that the controlling of at least one actuator of the actuator plane is carried out from the offboard plane. For this purpose, command data from an outsourced vehicle function can be transmitted via the communication device to the motor vehicle to the integration component, which then forms control data for at least one actuator of the actuator device of the motor vehicle. Finally, it can also be provided that a vehicle function executed in the motor vehicle generates command data on the basis of which, by means of the communication device, the integration component then emits them offboard as actuator-specific control data to an actuator device external to the vehicle.

In accordance with some embodiments, the integration component provides the state data at a retrieval interface that is accessible to all vehicle functions performed by the computing device. The provided state data are then selected and retrieved by each vehicle function by means of the described retrieval routine at this retrieval interface. By making the state data accessible to all vehicle functions at the retrieval interface, a vehicle function can be retrofitted and then also select and retrieve state data by means of a retrieval routine. This means that a new vehicle function can be retrofitted in the motor vehicle without having to provide an additional sensor unit.

As already described, the integration component transforms the sensor data into the respective state data. This can be achieved by performing a units conversion. For example, for a steering angle between degree and an indication conditioned by the manufacturer of a sensor unit can be converted. Additionally or alternatively, scaling can be performed. Thus, a value range of the sensor data can be adapted to a value range required by a vehicle function. Additionally or alternatively, a plurality of sensor signals, each represented by the sensor data, can be connected to an environmental signal, whose state data can then be retrieved by a vehicle function. This allows preprocessing to be provided by the integration component. The transforming of sensor data into state data makes the sensor units replaceable without the need for interpretation of the state data by the vehicle functions.

In accordance with some embodiments, the described retrieval routines, by means of which the vehicle functions retrieve state data from the integration component, are in particular independent of a manufacturer and/or construction model of each sensor unit. Thus, the vehicle function can be developed independently of hardware conditions in the form of sensor units and/or independently of supplier conditions of the suppliers of the sensor units. The adaptation of a vehicle function to the sensor unit present in the motor vehicle is carried out by the integration component. Thus, a hardware-independent development or production of vehicle functions is possible.

The vehicle functions on the one hand and each sensor unit on the other are preferably designed in such a way that they can be replaced independently of one another. The exchange or replacement of a vehicle function or a sensor unit is compensated or laminated on the respective other side by the integration component.

In accordance with some embodiments, the integration component can be designed like a vehicle function as part of the computing device, e.g., as a further program module. In particular, it is provided that the integration component is provided separately from the sensor device and the detection routine, by means of which the integration component procures or determines sensor data at the at least one sensor unit of the sensor device, then comprises that the integration component receives the sensor data from the sensor device via a data network of the motor vehicle. The data network can, for example, be based on an Ethernet network and/or a data bus system, such as a Controller Area Network (CAN) bus. It is therefore not necessary for each sensor unit to provide its own integration component in order to emit or utilize its sensor data in the motor vehicle.

Up to now, the transmission of sensor data from the sensor plane to the computing plane has been described. In accordance with some embodiments, it can also be possible to control at least one actuator or actuator of an actuator device of a motor vehicle in the computing plane from the vehicle functions. The said sensor plane can therefore also be a combined sensor-actuator plane that has at least one actuator. As an actuator, for example, one of the following can be provided: an electric motor, pneumatics, mechatronics, a pump, an electric lock, an internal combustion engine, to name just a few examples. In order to logically separate the computing plane with the vehicle functions from the actuator plane, the following is preferably provided.

The integration component transfers this control data to the respective actuator using the actuator-specific control routine. In the vehicle function itself, there is no need to implement how control data is generated for a specific actuator. It is sufficient to perform an actuator-independent calling routine with command data. The command data can also be formulated or formed independent of the actuator. The translation into the actuator-specific control data is performed by the integration component. Thus, the actuator controlling is also separated from the vehicle functions. There is a call interface at which all vehicle functions can deliver command data to the integration component by means of a respective calling routine. This generates the actuator-specific control data, which can then be sent via the said data network to one actuator at a time.

Each of the vehicle functions therefore does not have to be familiar with or concerned with the generation of actuator-specific control data of the actuator device. Instead, each of the vehicle functions retrieves a calling routine of the integration component and delivers command data to it that indicate what the respective actuator should do or execute. Thus, the vehicle function is hardware-independent. This results in a uniform protocol for the calling routine for the vehicle functions. The replacement of an actuator therefore does not require the vehicle function to be adapted as well. The actuator-specific control data, on the other hand, can contain control commands that can only be interpreted by the controlled actuator. For example, the calling routine can generally include the setting of a steering angle by the indication of "degrees" (e.g., "5° left"), while the responsible actuator, for example, expects an indication in a manufacturer-specific format (e.g. "12 ticks left") as control data. The conversion then takes place in the integration component. In addition, each actuator is available for a plurality of vehicle functions via the integration component, so that not every vehicle function itself has to be provided together with its own actuator.

In accordance with some embodiments, the transforming of command data into respective control data can include, for example, performing a units conversion and/or scaling. This allows the vehicle functions to be implemented or developed independent of actuator-specific definitions of the control data.

In accordance with some embodiments, a vehicle function can be retrofitted to the computing device in the motor vehicle. Preferably, due to the flexibility in retrofitting of vehicle functions, it is provided that the computing device should retrofit or install at least one additional vehicle function on the basis of application data (i.e., program data or a program module for an additional vehicle function) and then couple them to the integration component. The application data can, for example, be received via the said communication device.

Previously, the sensor device was written as a passive sensor plane having only the sensor units or sensor-actuator plane, in which all logic or processing is shifted to the computing plane. But this is not always advantageous. In accordance with some embodiments, it is provided that at least one sensor unit of the sensor device operates a respective self-protection function and that the respective self-protection function generates control data autonomously, independent of the integration component, in dependence on the sensor data of the sensor unit. Thus, an actuator can also be controlled within the sensor device, for example, or a sensor unit can be shut down. The sensor device is thus not completely passive. For example, an automatic shutdown of a sensor unit can be carried out if it is operated outside a permissible operating range, for example if it is overheated.

The described indirect transmitting of the sensor data via the integration component to the vehicle functions can lead to a delay or to a limitation of the data rate. In order not to have to accept this for sensor units which require a predetermined minimum data rate for the complete output of the sensor data, in accordance with some embodiments, at least one vehicle function is coupled to at least one sensor unit of the sensor device via a direct link while bypassing the integration component. For example, a vehicle function can be coupled in this way with a video camera, an infrared camera, and/or a radar. Sensor data are then received from the sensor unit via the vehicle function at a data rate greater than a data rate provided by the integration component as it is provided for the state data. Thus a direct reading of sensor data for a vehicle function is possible.

In order to perform the method as described herein in accordance with some embodiments, the described computing plane is disclosed. In accordance with some embodiments, a computing device for a motor vehicle, the computing device having at least one processor (microprocessor or microcontroller) for executing vehicle functions is disclosed. The computing device comprises the described integration component which is designed to couple the vehicle functions to a sensor device of the motor vehicle and to procure sensor data from one sensor unit or a plurality of sensor units of the sensor device independently of the vehicle functions by means of a respective sensor-specific detection routine and to generate respective state data therefrom and to provide each of the vehicle functions in the described manner for retrieval via a sensor-independent retrieval routine.

In accordance with some embodiments, a motor vehicle is disclosed. The motor vehicle has the sensor device for generating sensor data and an embodiment of the computing device as described herein, where the sensor device being coupled to an integration component of the computing device.

In accordance with some embodiments, the motor vehicle also has an actuator device with at least one actuator and this actuator device is also coupled to the integration component of the computing device.

The present application also includes further embodiments of the computing device and the motor vehicle, which have features such as those previously described in connection with the further embodiments of the process as described in the present application. For this reason, the corresponding further embodiments of the computing device and the motor vehicle are not described here again.

Embodiments of the present application are described below with respect to FIG. 1. FIG. 1 shows a schematic representation of a motor vehicle, in accordance with some embodiments.

The embodiments explained below are preferred embodiments that constitute individual features that are to be considered in isolation from one another individually or in a combination other than the one disclosed. In addition, features additional to those already described can also be added to the described embodiments.

FIG. 1 shows a motor vehicle 10, which can be, for example, a passenger car or truck. In addition, an offboard plane 11 (OFFBOARD) remote to the vehicle is represented which can, for example, include a mobile terminal 12 and/or an Internet server 13 and/or foreign vehicles 14. These each represent a third-party device remote from the vehicle. The vehicle's own area or the area belonging to the motor vehicle 10 is described here as the ONBOARD onboard area.

In accordance with some embodiments, in motor vehicle 10, its electronic architecture 15 can be divided into two planes, namely a computing plane 16 and a sensor/actuator plane 17. The computing plane 16 can be formed by a computing device 18, which can comprise one or more processors 19. On the sensor/actuator plane 17, a sensor device 20 and an actuator device 21 can be provided. The transmitting device 21 can comprise sensor units 22, for example a steering angle sensor and/or a sensor system of a high-voltage battery and/or a radar. The actuator device 21 can have one or more actuators 23, for example an electrically displaceable or movable door and/or a tailgate motor and/or a window lifter. In general, the sensor-actuator plane 17 provides specific sensor/actuator-related functions, such as an electronic stability control (ESC), a window lift control, a motor control for a drive motor of the motor vehicle 10.

The sensor/actuator plane 17 can be linked to the computing plane 16 via a data network 24. Thus, sensor data 25 can be transmitted from the sensor device 20 to the computing device 18. From the computing device 18, control data 26 can be transmitted to the actuator device 21.

The computing device 18 can be provided for operating at least one functional component 27. A functional component 27 can be, for example, a program module or a software component. By operating a functional component 27, in each case at least one vehicle function 28 is executed by the respective functional component 27. Examples of such vehicle functions are automated driving, the providing of an environment model for modeling an environment of the motor vehicle 10 and/or an interior scenery of the motor vehicle 10 and a thermometer management. In general, the vehicle functions 28 represent comprehensive, compute- and/or data-intensive vehicle functions that do not require direct realization at the sensor device 20 and/or the actuator device 21.

The functional components 27 do not have to be able to process the sensor data 25 directly. Likewise, the functional components 27 do not have to be configured to generate the control data 26. Rather, the sensor/actuator plane 17 and the computing plane 16 are coupled via an integration component 29, which can transform the sensor data 25 into state data 30. The control data 26 can be generated by the integration component 29 from command data 31 that can be generated by the vehicle functions 28.

The vehicle functions 28 therefore only have to communicate with the integration component 29. For this purpose, you can retrieve the state data 30 from a retrieval interface of the integration component 29 via a respective retrieval routine 32. The command data 31 can deliver the vehicle functions 28 to a calling interface 34 by means of a respective calling routine 35 to the integration component 29.

The integration component 29 can receive the sensor data 25 from the data network 24 by means of a detection routine 36. For example, the detection routine 36 can provide the reading a CAN bus. By means of a control routine 37, the integration component 29 can deliver the control data 26 via the data network 24 to the actuators 23.

With regard to the offboard plane 11, it is provided that its components 12, 13, 14 can be provided as data providers for source data 40. These can be received via a communication device 41 of the motor vehicle 10 via respective communication links 42 from, for example, the terminal 12 and/or the server 13 and/or a third-party vehicle 14. Furthermore, for example, an outsourced functional component 27' can also be operated on the server 13, by means of which outsourced vehicle functions 28' can be executed. These can then also be used in the motor vehicle 10, for example, for route planning, navigation and/or as source data 40 traffic light information or map data can be provided. Furthermore, state data 30 in the offboard plane 11 can also be provided via the communication links 32.

The processors 19, the communication device 41 and the data network 24 can be connected via a data highway 23, i.e. a data bus system and/or data network system, such as a PCI (Peripheral Component Interconnect) bus.

By separating vehicle functions 28 from sensor/actuator plane 17 and by using sensor-independent retrieval routines 32 as well as actuator-independent calling routines 35, a vehicle function can be developed independent of the design of the sensor units 22 and actuators 23. The associated function component 27, i.e. the program code, can be flexibly reloaded in the computing device 28, the abstractions of sensor/actuator plane 17 of the computing plane 16 is made possible by the integration component 29, which enables a hardware-independent development of the function components 27.

The three planes 11, 16, 17 are consistently connected or designed uniformly by the continuous communication and protocol mechanisms, based on the retrieval routines and the calling routines.

This results in a functional overall concept for executing hardware-independent vehicle functions 28, 28'.

Uniform guidelines can be issued for the outline of individual vehicle functions 28, 28' into subfunctions, whereby the assignment of each subfunction can be carried out in one of the planes 11, 16, 17. This results in a much better understanding of the system and a better manageability. A simple reloading of function components 27 and thus functionalities in the motor vehicle 10 is allowed. If an error occurs, it can be searched systematically.

In accordance with some embodiments, the following division of the described subfunctions in the architecture is carried out.

Sensor/actuator plane 17 is provided for hardware-related control and data processing. Mechatronically dependent functions such as controlling of hardware, reading/providing of sensor values and/or self-protection such as temperature monitoring and/or interruption of an electrical current can be implemented. An actuator-related regulation can also be provided, such as the aforementioned ESC regulation. However, sensor/actuator plane 17 does not contain any additional functions, such as a speed control for the drive motor. This results in a Smart Sensor and Smart Actuator concept provided by the self-protection. However, as the sensor units 22 and the actuators 23 do not interact directly with the vehicle functions 28, standardized components can be used, which are then made available for the vehicle functions 28 via the integration component 29.

As a result of the integration component 29, a domain administration results in which the sensor device 20 and the actuator device 21 are made available for the function components 27 via the integration component 29. This results in input/output preprocessing for the actual vehicle functions. Domain-specific functions can also be provided, such as load management, a keyless access and engine start and/or steering control. In general, a mechatronically independent functionality can be implemented in computing plane 16.

The functional components 27 can be executed by the processors 29 of the computing device 18 with high performance computing power. Powerful hardware and operating system software are thus available to execute vehicle functions 28. Vehicle-comprehensive computing and data-intensive vehicle functions, such as autonomous driving, provision of an environment model and/or machine learning can also be implemented here. No adaptation to a hardware-specific input/output is necessary.

Thus, the computing device 18 provides generic computing power by means of which any vehicle functions that are mechatronically independent can be executed.

Through the offboard plane 11, computing and data-intensive vehicle functions such as group data analysis for the evaluation of state data of a plurality of motor vehicles can be carried out. It is also possible to perform outsourced vehicle functions 28' provided for a specific vehicle, such as navigation or voice recognition. Data sources for vehicle functions 28, such as music streaming and/or object detection of surrounding objects and/or receiving warnings from other motor vehicles and/or map data, can also be connected to the motor vehicle 10 via communication links 42.

Overall, the examples show how an automotive 3-plane architecture concept for a motor vehicle.

The invention claimed is:

1. A method, comprising:
procuring, at an integration component of a computing device located in a motor vehicle, sensor data from a sensor unit of a plurality of sensor units of a sensor device located in the motor vehicle using a sensor-specific detection routine;
establishing a communication link between a communication device of a plurality of communication devices of the motor vehicle and at least one third-party device, wherein the at least one third-party device is external of the motor vehicle, and wherein the at least one third-party device is a component of a plurality of components of an off-board plane, wherein each component of the plurality of components of the off-board plane is a supplier of source data;
receiving, at the integration component, the source data via the established communication link, wherein the integration component is coupled to the communication device;
generating, at the integration component, state data based on the procured sensor data and the received source data;
providing the state data for retrieval at a retrieval interface, wherein the retrieval interface is accessible to a plurality of vehicle functions; and
retrieving at least some state data of the state data at the retrieval interface using a retrieval routine by a vehicle function of the plurality of vehicle functions, wherein the vehicle function is implemented in the computing device,
wherein the motor vehicle and the sensor device are coupled via the integration component,
thereby providing the vehicle function in the motor vehicle.

2. The method of claim 1, wherein to retrieve the at least some state data by the vehicle function, the vehicle function and the sensor unit are coupled via the integration component or via a direct link between the vehicle function and the sensor unit, and wherein a data rate of retrieval of the at least some state data using the direct link exceeds a data rate of retrieval of the at least some state data via the integration component.

3. The method of claim 1, wherein the at least one third-party device is a mobile terminal, an Internet server, or another motor vehicle.

4. The method of claim 1, further comprising:
generating command data for controlling at least one actuator device of a plurality of actuator devices;
transmitting the command data to the integration component using an actuator-independent calling routine by the vehicle function;
transforming the command data into control data, wherein the control data corresponds to the at least one actuator device; and
transmitting the control data to the at least one actuator device,
wherein the at least one actuator device and the vehicle function is coupled via the integration component.

5. The method of claim 1, wherein generating the state data comprises performing at least one of a unit conversion of the sensor data, a scaling of the sensor data, or an interconnection of a plurality of sensor signals into an environmental signal.

6. The method of claim 1, wherein the retrieval routine is independent of the sensor unit, a manufacture of the sensor unit, or a building model of the sensor unit.

7. The method of claim 1, wherein the vehicle function and the sensor unit are replaceable independent of each other.

8. The method of claim 1, wherein the sensor data is procured at the integration component via a data network of the motor vehicle, and wherein the integration component is separate from the sensor device.

9. The method of claim 1, further comprising transmitting at least some state data of the state data for retrieval by a vehicle function executed in the at least one third-party device over the established communication link.

10. The method of claim 1, further comprising:
retrofitting another vehicle function based on application data of the another vehicle function at the computing device; and
coupling the another vehicle function with the integration component.

11. The method of claim 1, wherein the sensor unit operates a self-protection function, wherein the self-protection function generates control data autonomously or independent of the integration component based on the sensor data of the sensor unit.

12. A computing device, comprising:
at least one processor configured to execute at least one vehicle function of a plurality of vehicle functions of a motor vehicle;
an integration component configured to:
couple the at least one vehicle function with a sensor device;
couple the motor vehicle with the sensor device;
procure sensor data from at least one sensor unit of a plurality of sensor units of the sensor device using a sensor-specific detection routine;
establish a communication link between a communication device of a plurality of communication devices of the motor vehicle and at least one third-party device, wherein the at least one third-party device is external of the motor vehicle, and wherein the at least one third-party device is a component of a plurality of components of an off-board plane, wherein each component of the plurality of components of the off-board plane is a supplier of source data;
receive the source data via the established communication link, wherein the integration component is coupled to the communication device;
generate state data based on the procured sensor data and the received source data;
provide the state data for retrieval at a retrieval interface, wherein the retrieval interface is accessible to the plurality of vehicle functions; and
retrieve at least some state data of the state data at the retrieval interface using a retrieval routine by a vehicle function of the plurality of vehicle functions, wherein the vehicle function is implemented in the computing device, wherein the computing device is located in the motor vehicle.

13. The computing device of claim 12, wherein the integration component is further configured to:

receive command data from the vehicle function using an actuator-independent calling routine for controlling at least one actuator device of a plurality of actuator devices;
transform the command data into control data, wherein the control data corresponds to the at least one actuator device; and
transmit the control data to the at least one actuator device,
wherein the at least one actuator device and the vehicle function is coupled via the integration component.

14. The computing device of claim 12, wherein to generate the state data, the integration component is further configured to perform at least one of: a unit conversion of the sensor data, a scaling of the sensor data, or an interconnection of a plurality of sensor signals into an environmental signal.

15. The computing device of claim 12, wherein the integration component is further configured to transmit at least some state data of the state data for retrieval by another vehicle function executed in the at least one third-party device over the established communication link,
wherein the at least one third-party device is a mobile terminal, an Internet server, or another motor vehicle, and
wherein the communication device is one of: a Global System for Mobile Communication (GSM) module, Universal Mobile Telecommunications Service (UMTS) module, a Long Term Evolution (LTE) module, a Wireless Local Area Network (WLAN) module, a Car2X communication module, and a vehicle-to-vehicle communication module.

16. A motor vehicle, comprising:
a sensor device;
a plurality of communication devices; and
a computing device comprising:
at least one processor configured to execute at least one vehicle function of a plurality of vehicle functions of the motor vehicle;
an integration component configured to:
couple the at least one vehicle function with the sensor device;
couple the motor vehicle with the sensor device;
procure sensor data from at least one sensor unit of a plurality of sensor units of the sensor device using a sensor-specific detection routine;
establish a communication link between a communication device of the plurality of communication devices and at least one third-party device, wherein the at least one third-party device is external of the motor vehicle, and wherein the at least one third-party device is a component of a plurality of components of an off-board plane, wherein each component of the plurality of components of the off-board plane is a supplier of source data;
receive the source data via the established communication link, wherein the integration component is coupled to the communication device;
generate state data based on the procured sensor data and the received source data;
provide the state data for retrieval at a retrieval interface, wherein the retrieval interface is accessible to the plurality of vehicle functions; and
retrieve at least some state data of the state data at the retrieval interface using a retrieval routine by a vehicle function of the plurality of vehicle functions, wherein the vehicle function is implemented in the computing device, wherein the computing device is located in the motor vehicle.

17. The motor vehicle of claim 16, further comprising a plurality of actuator devices, wherein the integration component is further configured to:
   receive command data from the vehicle function using an actuator-independent calling routine for controlling at least one actuator device of the plurality of actuator devices;
   transform the command data into control data, wherein the control data corresponds to the at least one actuator device; and
   transmit the control data to the at least one actuator device,
   wherein the at least one actuator device and the vehicle function are coupled via the integration component.

18. The motor vehicle of claim 16, wherein to generate the state data, the integration component is further configured to perform at least one of: a unit conversion of the sensor data, a scaling of the sensor data, or an interconnection of a plurality of sensor signals into an environmental signal.

19. The motor vehicle of claim 16, wherein the integration component is further configured to transmit at least some state data of the state data for retrieval by another vehicle function executed in the at least one third-party device over the established communication link,
   wherein the at least one third-party device is a mobile terminal, an Internet server, or another motor vehicle.

20. The motor vehicle of claim 16, wherein the communication device is one of: a Global System for Mobile Communication (GSM) module, Universal Mobile Telecommunications Service (UMTS) module, a Long Term Evolution (LTE) module, a Wireless Local Area Network (WLAN) module, a Car2X communication module, and a vehicle-to-vehicle communication module.

* * * * *